United States Patent [19]

Juchnowski

[11] Patent Number: 4,671,542
[45] Date of Patent: Jun. 9, 1987

[54] SWIVEL HOSE COUPLING ASSEMBLY AND METHOD

[75] Inventor: Ray Juchnowski, Garfield Heights, Ohio

[73] Assignee: Dana Corporation, Toledo, Ohio

[21] Appl. No.: 682,647

[22] Filed: Dec. 17, 1984

[51] Int. Cl.⁴ .............................................. F16L 33/00
[52] U.S. Cl. .................................. 285/174; 285/256;
285/382; 285/281; 29/508; 29/520; 29/516
[58] Field of Search .............. 285/256, 257, 382, 174,
285/272, 281; 29/508, 520, 516, 515, 517

[56] References Cited

U.S. PATENT DOCUMENTS

| | | | |
|---|---|---|---|
| 1,944,890 | 1/1934 | Heidloff | 29/508 |
| 2,374,270 | 4/1945 | Brock | 29/520 |
| 2,430,921 | 11/1947 | Edelmann | 29/508 |
| 2,704,074 | 3/1955 | Butler | 29/508 |
| 2,808,643 | 10/1957 | Weatherhead | 29/508 |
| 2,926,029 | 2/1960 | St. Clair et al. | 285/256 |
| 3,017,203 | 1/1962 | Malledo | 29/508 |
| 3,222,091 | 12/1965 | Marshall | 285/95 |
| 3,262,721 | 7/1966 | Knight | 285/174 |
| 3,371,408 | 3/1968 | Charbonnet | 29/508 |
| 3,951,438 | 4/1976 | Scales | 285/256 |
| 4,369,992 | 1/1983 | Fournier et al. | 285/256 |
| 4,392,678 | 7/1983 | Adamczyk | 29/520 |

FOREIGN PATENT DOCUMENTS

| | | | |
|---|---|---|---|
| 674846 | 4/1939 | Fed. Rep. of Germany | 29/520 |
| 702913 | 2/1941 | Fed. Rep. of Germany | 285/256 |
| 2459690 | 6/1975 | Fed. Rep. of Germany | 285/256 |
| 1393884 | 2/1965 | France | 285/256 |
| 2000840 | 1/1979 | United Kingdom | 285/256 |
| 566051 | 7/1977 | U.S.S.R. | 285/256 |

Primary Examiner—Cornelius J. Husar
Assistant Examiner—Eric K. Nicholson
Attorney, Agent, or Firm—Frank B. McDonald

[57] ABSTRACT

A swivel hose coupling assembly and method provides a collar having an angularly inwardly disposed locking annulus. The angular disposition of the locking annulus permits a novel method of assembling the swivel hose coupling members.

In a preferred form, the assembly is designed for affixation to one end of an elastomeric hose, and includes a cylindrical insert having a serrated external surface at one end thereof, a shoulder at an opposing end, and a locking groove intermediate the serrated surface and shoulder. A fitting is rotatably mounted over the insert, the fitting having a mating shoulder for contact with the shoulder of the insert. An annular collar is concentrically positioned over an exposed end of the fitting, a first end of the collar containing the locking annulus being inserted first over the serrated portion of the insert. A force is then applied to the second end of the collar, causing the locking annulus to be forced against a rearwardly disposed wall on the fitting and to distort same radially inwardly into the locking groove of the insert. The result is a simple three-part assembly which may receive a hose end for conventional crimping between collar and insert.

1 Claim, 1 Drawing Figure

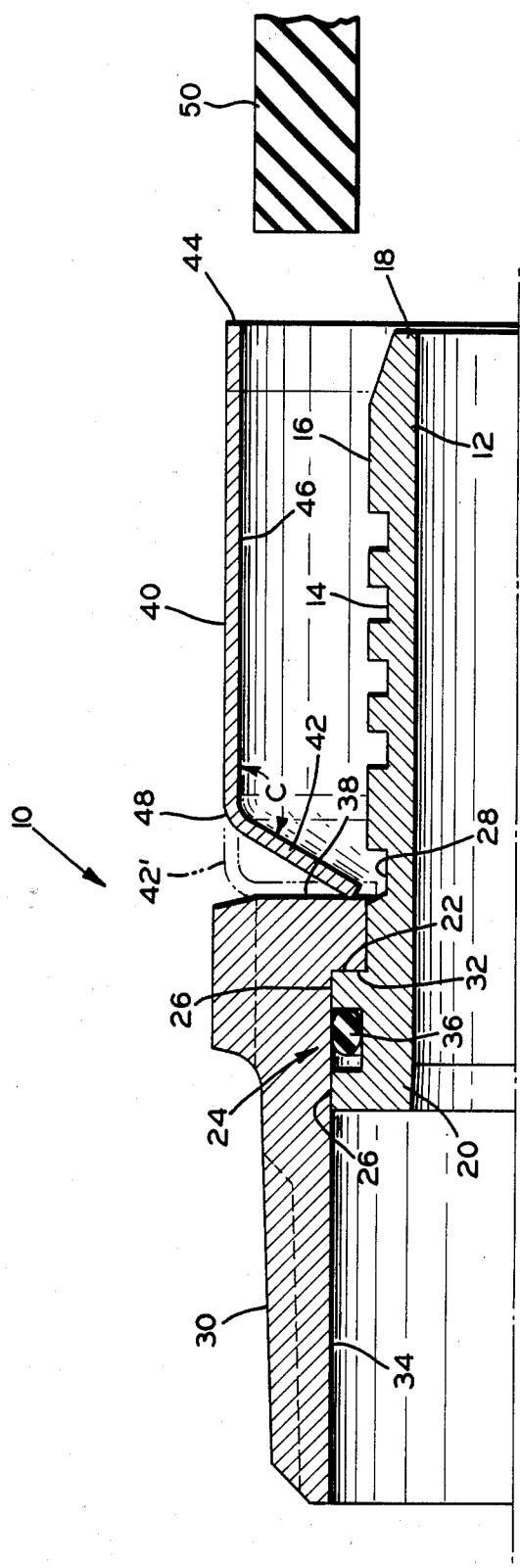

SWIVEL HOSE COUPLING ASSEMBLY AND METHOD

BACKGROUND OF THE INVENTION

This invention relates to swivel hose coupling assemblies and methods of manufacture. More particularly, the invention relates to methods of forming such assemblies, particularly the metallic collar members utilized to crimp elastomeric hose onto serrated portions of metal inserts.

Numerous prior art swivel hose assemblies are available, most including a relatively high number of machined parts, all preformed for later assembly. Such preformed parts must be carefully toleranced, and involve elaborate precautions to insure proper installation. As a rule, for quality control purposes such parts are generally assembled at work stations. Hence, the major drawbacks of existing assemblies include the special tolerance requirements, high numbers of parts per assembly, and undue complexity of part members.

SUMMARY OF THE INVENTION

The swivel hose coupling assembly and method of the present invention provides a coupling system which is simple and inexpensive. In a preferred form, the assembly includes a cylindrical brass insert having a serrated surface at one end, and includes a radial shoulder facing axially inwardly of the opposite end. Intermediate of the serrated surface and the radial shoulder is a groove for receiving a locking annulus positioned on a first end of a collar disposed for overlying the serrated portion of the insert. The locking annulus is fabricated at an angle greater than ninety (90°) degrees with respect to the body of the collar to allow positioning over the insert without interference during installation. A hose fitting member completes the assembly, the latter including a shoulder for mating with the shoulder of the insert, and for being rotatable about the insert.

A preferred method of assembling of the swivel hose coupling of this invention includes the steps of:

(1) forming a subassembly of insert and fitting member with the aforementioned shoulders positioned in an abutting relationship, the insert including a locking groove, (2) positioning a collar over the serrated surface of the insert, the collar including the angularly disposed locking annulus for making contact with a rear wall of the fitting, (3) applying an axial force to the free end of the collar sufficient to cause the locking annulus to distort fully radially inwardly against the rear wall of the fitting, so that the annulus becomes fixed into positive engagement with the locking groove, (4) inserting a hose end between the second end of the collar and the insert, and (5) crimping the collar radially about the hose end to permanently clasp the hose firmly between collar and insert.

BRIEF DESCRIPTION OF THE DRAWING

The drawing FIGURE is a partial cross section of a preferred embodiment of a swivel hose coupling assembly of the present invention.

DETAILED DESCRIPTION OF A PREFERRED EMBODIMENT

A partial sectional side view of a preferred embodiment of the swivel hose coupling assembly of the present invention is shown generally at 10 in the drawing FIGURE. The assembly includes an insert 12, preferably formed of brass, which contains serrations 14 in an outer circumferential surface 16 of the rightward end 18 thereof. At the opposite or leftward end 20 of the insert 12 is a radially extending shoulder 22 which extends circumferentially beyond, or radially outwardly of the serrations 14. The shoulder 22 is defined by a seal housing portion 24 contained at the end 20 of the insert 12. The seal housing portion 24 has a greater diameter than does the surface 16 containing the serrations 14. A locking groove 28 is positioned intermediate the seal housing portion 24 and the serrations 14.

A fitting 30 circumferentially engages the insert 12, and includes a radially inwardly extending second shoulder 32 disposed for matingly engaging the first described shoulder 22 on the insert 12. An internal circumferential wall 34 of the fitting is piloted on a pair of external circumferential pilot surfaces 26 of the seal housing portion 24 of the insert 12, as shown. An 0-ring seal 36 is disposed within the seal housing portion 24, and engages the internal wall 34 of the fitting 30. The fitting 30 includes a radially extending rear wall 38 which aligns radially with the locking groove 28 of the insert 12.

A third and final portion of the assembly is a cylindrically shaped collar 40 made of a thin walled metal, also preferably of brass, for the purpose of crimping an elastomeric hose (not shown) between the collar and against the serrations 14 of the insert 12. The collar 40 is manufactured with an angularly disposed locking annulus 42, preferably formed as an integral part of a first end 48 of its generally cylindrical body 46. The locking annulus 42 is disposed radially inwardly at an angle "C" greater than ninety (90°) degrees with respect to the cylindrical body 46. The greater angle enables interference free passage of the annulus over the serrations 14 of the insert during installation of the collar. In preferred form, the angle is in the range of 115°–140°. The annulus 42 is designed such that as an axial pressure is later applied to its second end 44, the annulus will be forced against the rear wall 38 of the fitting 30, forcing the annulus to deflect radially inwardly, as shown in phantom at 42', to thereby engage the locking groove 28 of the insert 12. At this juncture, angle "C" becomes equal to ninety (90°) degrees, and hence the annulus 42 makes a right angle with respect to the body 46.

One preferred method of attaching the swivel hose coupling assembly to an elastomeric hose and 50 in accordance with the present invention includes the steps of (1) forming a subassembly of the insert and the fitting with the first and second shoulders positioned in an abutting relationship, (2) positioning the collar over the serrated surface of the insert, with the locking annulus making contact with the second shoulder, (3) applying an axial force to the second end of the collar sufficient to cause the locking annulus to distort fully radially inwardly and into positive engagement with the locking groove, (4) inserting a hose end between the second end of the collar and the insert, and (5) crimping the collar radially onto said hose end to clasp the hose firmly between the collar and the serrated surface portion of the insert.

As will be apparent to those skilled in the art, the use of a collar having a locking annulus which is initially angularly disposed as herein described provides for a manufacturing flexibility not heretofore realized. The use of a thin shell collar engageable with the insert without the use of complex machine parts operates to significantly reduce the cost of both manufacturing and assembly. Moreover, the method disclosed herein provides a system which is much simpler and relatively less cumbersome to utilize than traditionally available systems.

Although only one preferred embodiment and one method have been described in detail herewith, the appended claim covers a number of variations which will fall within the spirit and scope of this invention.

What is claimed is:

1. In a hose coupling assembly including a cylindrical insert having a first annular shoulder at a first end thereof, and an externally serrated surface at an opposing second end thereof for enhancing frictional coupling with an elastomeric hose, said shoulder having an external circumference greater than that of said second end of said insert, said insert including an annular locking groove adjacent said shoulder, a fitting circumferentially engaging said insert, said fitting having a radially extending rear wall and a radially inwardly extending mating second shoulder disposed for engagement with said first shoulder, and a collar overlying said serrated surface of said insert, said collar having first and second ends; an improved method of coupling an elastomeric hose end to said assembly comprising steps in the following sequence:

(1) forming a locking annulus disposed radially inwardly at an angle greater than 90 degrees with respect to the cylindrical body of said collar,
(2) forming a subassembly of said insert and said fitting with said first and second shoulders in an abutting relationship, with said groove at least partially underlying said rear wall and being in radial alignment with said rear wall,
(3) positioning said collar over said serrated surface of said insert, with the locking annulus thereof in contact with said rear wall,
(4) applying axial force to said collar while fixedly holding said fitting sufficient to cause said locking annulus to distort fully radially inwardly into engagement with said locking groove,
(5) inserting a hose end between said second end of said collar and said insert, and
(6) crimping said collar radially into said hose end to crimp said hose firmly radially between said collar and said serrated surface.

* * * * *